United States Patent Office 3,177,212
Patented Apr. 6, 1965

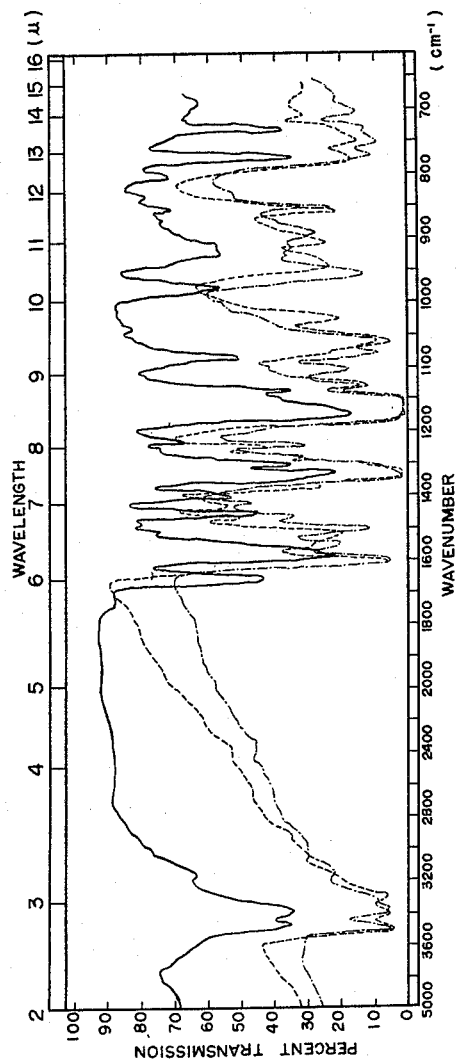

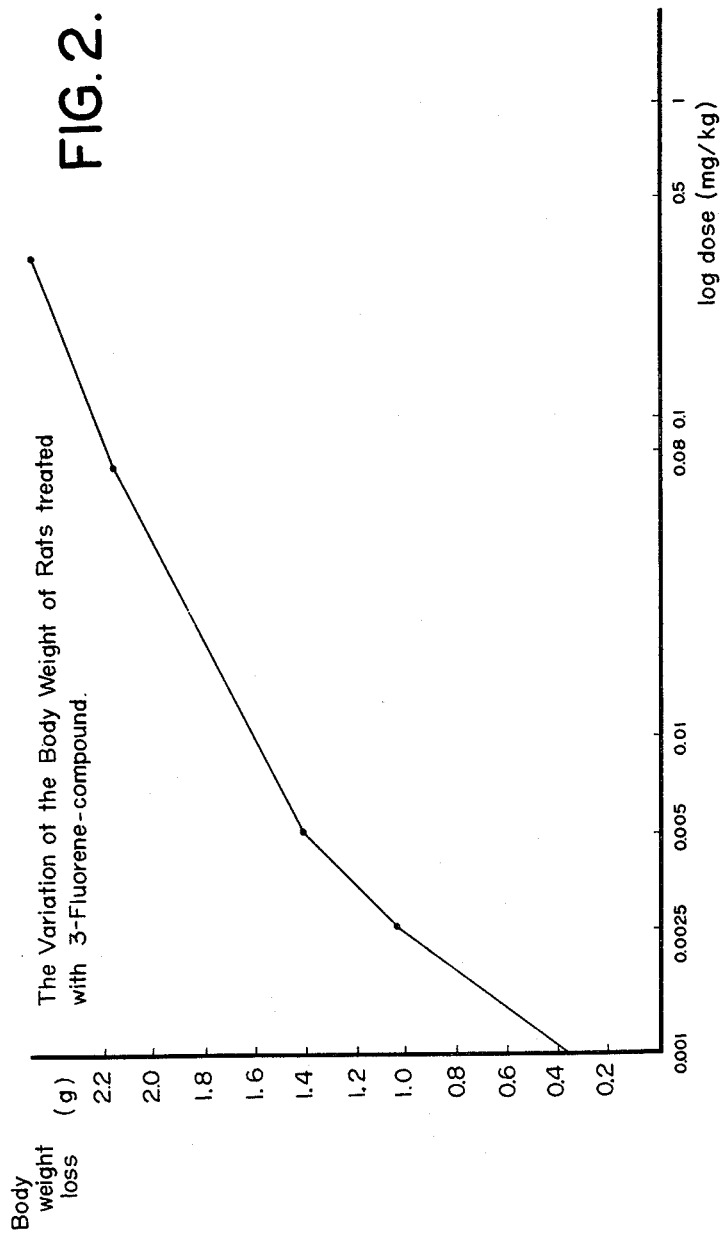

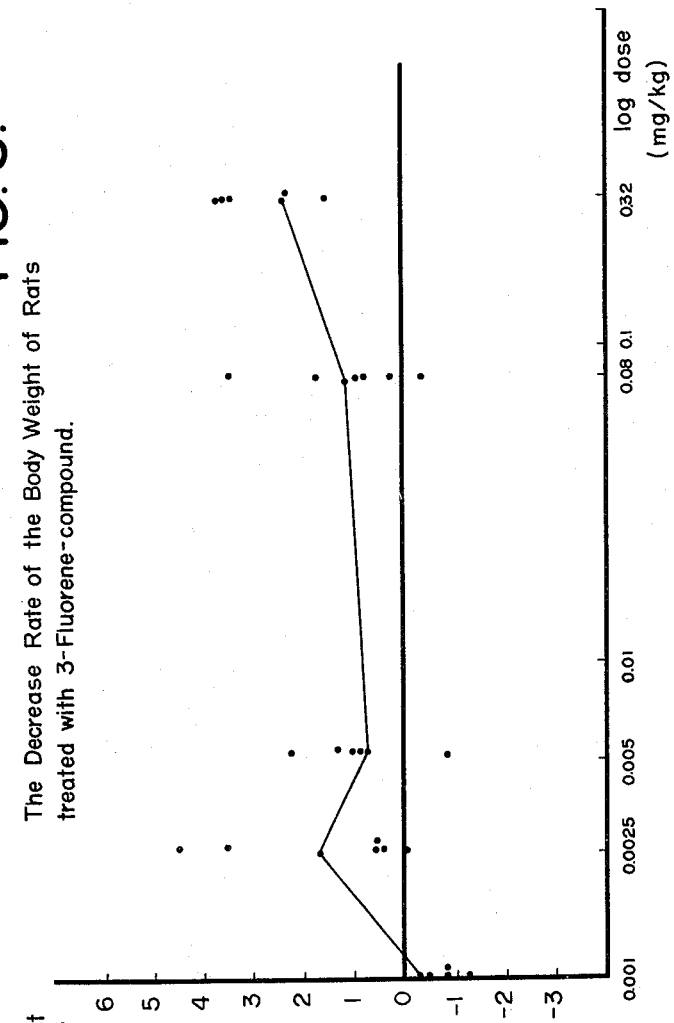

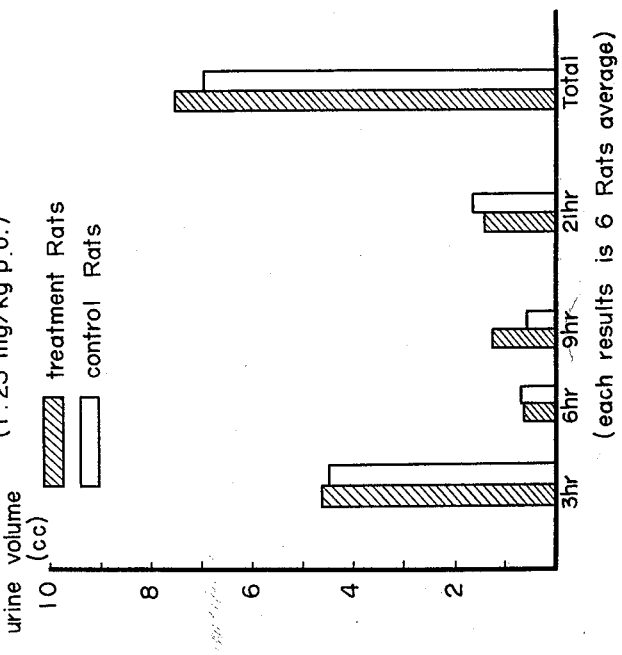
FIG. 5. The Increment result of Urine Volume of the Rats treated with chlorothiazide (1.25 mg/kg p.o.)
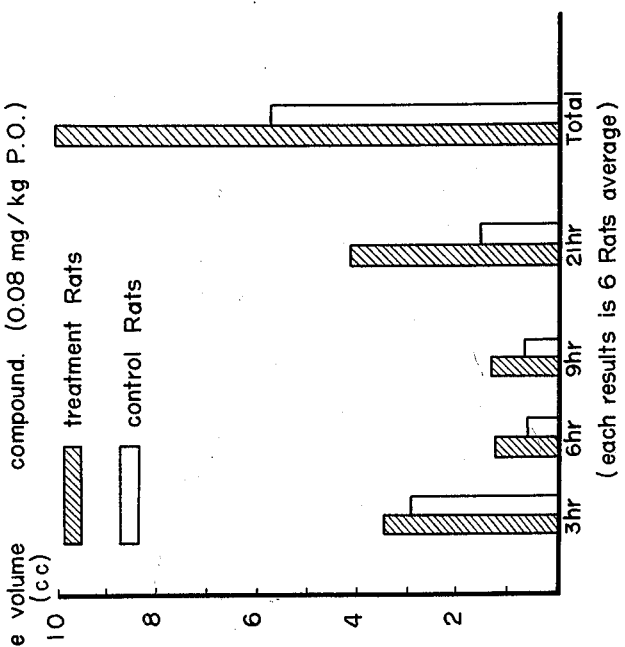
FIG. 4. The Increment result of Urine Volume of the Rats treated with 3-Fluorene compound. (0.08 mg/kg P.O.)
INVENTOR.
TSUTOMU IRIKURA
BY
McGlew and Toren
ATTORNEYS

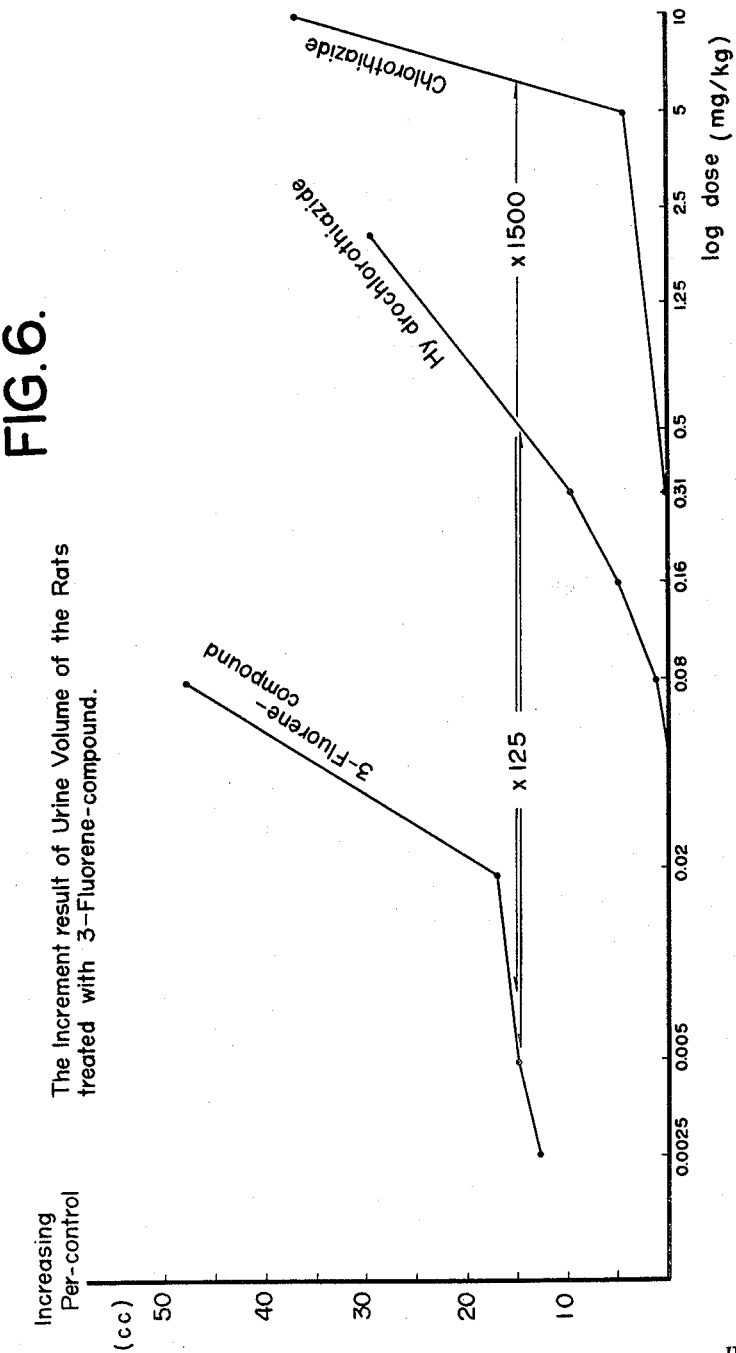

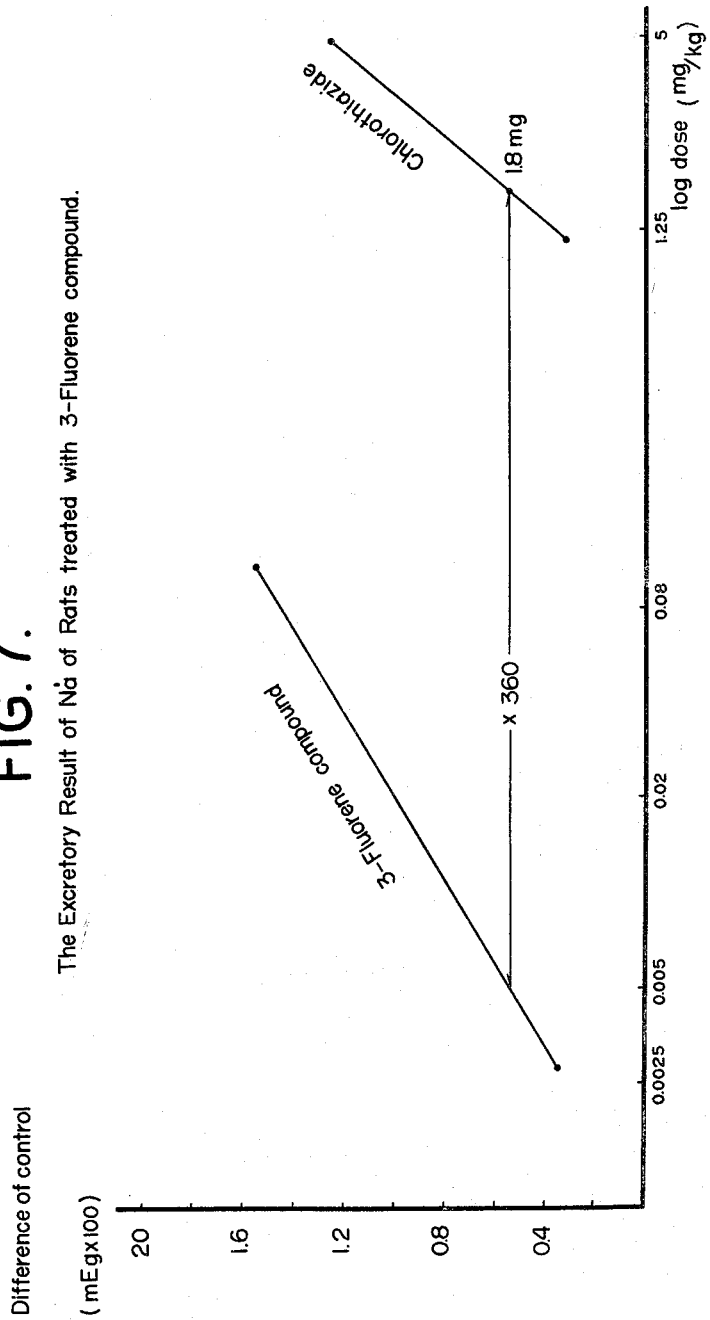

3,177,212
COMPOUND 3-DIPHENYLENEMETHYL - 6 - CHLO-RO-7-SULFAMYL - 3,4 - DIHYDRO - 1,2,4 - BENZO-THIADIAZINE
Tsutomu Irikura, 6 4-chome, Nihonbashi-Honcho, Chuo-ku, Tokyo, Japan
Filed Mar. 14, 1962, Ser. No. 179,681
Claims priority, application Japan, Feb. 8, 1962, 37/4,773
1 Claim. (Cl. 260—243)

The present invention is concerned with a new chemical substance of the formula

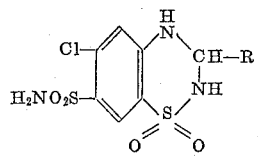

wherein R means

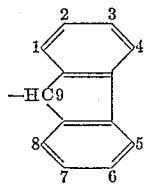

the new chemical substance corresponding hence to 3-diphenylenemethyl-6-chloro-7-sulfamyl - 3,4 - dihydro - 1, 2,4-benzothiadiazine-1, 1-dioxide. The invention relates to the method of preparing said type of new chemical substance.

The inventors concerned found that the above-mentioned compound is very useful because of its having diuretic and saluretic effects, the 3-diphenylenemethyl derivative which will hereinafter be often named "fluorene compound" being by far stronger in said effects than the known types of benzothiadiazine derivatives.

As compared with a hydrochlorothiazide in which the substituent R of the general Formula I is hydrogen, 3-fluorenyl-6-chloro-7-sulfamyl-3, 4-dihydro-1, 2,4-benzothiadiazine-1, 1-dioxide proves as seen in the infrared spectrum curves shown in FIG. 1 to be exaggerated in the bending vibration, for example, in a wave number of 1040, 1030, 1015, 885, 870, 855, 835 and 805 cm.$^{-1}$. The present inventor, paying his attention to the problem up to what extent the potency of benzothiadiazine as diuretic medicine can at all be enhanced according to the increase in carbon number of the hydrocarbon radical as R in 3-position, arrived through a number of experiments at the information that this potency can be extremely enhanced by introducing 9-fluorenyl radical as a substituent having many units capable of bending vibration into 3-position of benzothiadiazine. It is this information that underlay the present invention. So far as the appearance of chemical formula is concerned, the only distinction between diphenylmethyl radical and 9-fluorenyl radical is that while two benzene nuclei in the latter are bonded to each other, those in the former are not so. Nevertheless, the compounds in crystalline state prepared according to the present invention are notably different from each other. Thus, while the diphenylmethyl derivative is obtained as white powder melting at 176° C., the fluorene compound crystallizes into yellow needles of which the melting point is 306° C. They are markedly different also in physiological activity.

Some important properties of the fluorene compound according to the present invention, i.e., 3-diphenylenemethyl-6-chloro-7-sulfamyl-3,4-dihydro - 1,2,4-benzothiadiazine-1, 1-dioxide are mentioned as follows:

(1) CHEMICAL PROPERTY

The fluorene compound is obtained as yellow needle crystals melting at 306° C. It is soluble in dimethyl formamide as well as in dimethyl acetamide but practically insoluble in other organic solvents and water. An aqueous solution of alkali, however, is a good solvent for this substance.

(2) TOXICITY

The fluorene compound is very inactive in regard to toxity as confirmed by the fact that none of the dd-strain mice employed as test animal was put to death even when they were administered each with an emulsion containing beside a small quantity of C.M.C. lecithin this compound in an amout of 30 g. per kg. body weight of the animal, the acute toxicity being thus known to be above 30 g./kg.

The mice to which the fluorene compound was internally applied each by an amount of 10 g. per kg. body weight showed no abnormal signs in their internal organs including liver, spleen and kidney, but that intestines were found as colored yellow by the fluorene compound deposited therein. In the chronic toxicity, there is recognized no difference between 10 mice, bred for 30 days with feed containing 0.1% fluorene compound, and their control (10 mice) as the result of measurement of their body weight.

(3) BODY WEIGHT REDUCTIVE ACTION

Prior to estimating the diuretic effect of dosing the fluorene compound, every varying amount of this compound was administered in combination with 5 cc. of 0.2% saline solution to rats of the same venter ($F_1$), which had been kept abstaining from food for 18 hours. FIG. 2 shows the body weight decrement appraised by weighing the dosed rats in comparison with control ones after 21 hours. As seen in the figure, the difference in body weight found between dosed groups and control group of rats plotted along the ordinate increases as the dose plotted as logarithm of mg./kg. along the abscissa is enlarged, for the body weight decrease should in this case be imputed to urination alone. By the way, the spots joining the straight line segments in the figure stand each for a group of test animal comprising 5–6 rat individuals. While a dose of 1 γ per kg. body weight was thus found as effective in causing a distinct decrease of body weight, the body weight decrement estimated as percent of body weight points as seen from FIG. 3 to that the minimal effective dosage is 0.0025 mg./kg.

(4) EFFECTIVE DURATION

In judging the effect of medicines mutually different in effective duration in reference to the state of control test animal, it should be noticed the possibility of that such single measurement of urination in a certain interval after dose, for instance in the first 3 hours as according to J. J. chart (Schweiz. med. Wschr. 89 (12), 323–330 (1959)) may often fail to lead to recognition of possible efficacy of a medicine. In the case of the 3-fluorene compound, thus in fact, dosed test animal behaving yet as little different from the control in the first 3 hours, its diuretic efficacy was first made clear by examining the extent of urination at the times 6, 9 and 12 hours after the dose. This state of things is illustrated in FIG. 4 which tells that the urination from dosed rats was distinctly greater than that from control ones when evaluated at the times 6, 9 and 21 hours after the dose of 3-fluorene compound, the total urine volume estimated after 21 hours being also remarkably greater as compared with that for control rats. It is also reminded in this connection that chlorothiazide as an example of well-known kinds of benzothiadiazine can as shown in FIG. 5 act on rats so as to make them give a greater urine volume as compared with control ones so far as in the first 3 hours after the dose, while the predominance in urination of dosed rats over the control attains to a peak at the time 9 hours after the dose, after which time the situation goes into reverse, the urine volume becoming rather predominant for control rats. As seen from this state of things, if the determination of diuretic efficacy had been conducted only with resort to testing the urination in the first 3 hours, such an effective medicine as that obtained according to the present invention would not have been discovered as yet.

(5) DIURETIC EFFECT

In FIG. 6, results of urine volume measurement are shown as summmed up to the time 21 hours after the dose by plotting the increment in urine volume from the value for control rats and the common logarithm of dose in mg./kg. along the ordinate and the abscissa, respectively, the values of increment being each an average among 6 rats individuals composing each group of test animal dosed with a specified amount of a certain sort of benzothiadiazine. It may be said from these results that 3-fluorene compound has a potency 125 times and 1500 times as large as that of hydrochlorothiazide and that of chlorothiazide, respectively.

(6) MEDICAL ACTION OF EXCRETING SODIUM ION

Urine samples collected in the same way as in the just mentioned case of measuring total urine volume were assayed of their sodium ion content by means of a flame photometer, the results being presented in FIG. 7. The increment from control in excreted sodium ion are plotted in the figure as 100 times the number of equivalent along the ordinate and the logarithm of the amount of dose in mg./kg. along the abscissa, the spots plotted corresponding each to the values averaged among 6 rat individuals constituting each group of test animal. It was thus confirmed that while the effect of 3-fluorene compound reflected in the increase in urine volume is 1500 times as large as that of chlorothiazide, the same reflected in sodium ion excretion is 360 times as great as that of chlorothiazide.

(7) ACTION ON HUMAN BODY

When 1 mg. of the fluorene compound was internally applied to a man having a body weight, for instance, of 80 kg., his daily average of urine volume of 1100–1200 ml. was increased to 1600–2000 ml. while a decrease in body weight of 900 g. was realized in 3 days. It was observed in addition that excretions of potassium ion in successive urinations did not tend to increase at all but rather tended to decrease even when summed up for the same duration, a very important property in the clinical point of view. Further, the excretion of uric acid into urine either showed no appreciable change or decreased only to a slight extent. Also for the non-protein nitrogen in serum, no abnormal signs were observed.

The medical substance according to the present invention can be prepared with a good yield by making diphenylenemethyl formamide (9-formyl fluorene) react on 2,4-disulfamyl-5-chloro-aniline in the presence of a polar or non-polar solvent and water and an acid substance such as, for example, hydrochloric acid, sulfuric acid or acetic acid as catalyst at 100–80° C. for 2–6 hours.

*Example.—3-diphenylenemethyl-6-chloro-7-sulfamyl-3,4-dihydro-1,2,4-benzothiadiazine-1,1-dioxide*

On a steam bath, 6 g. 2,4-disulfamyl-5-chloroaniline and 5 g. of 9-formylfluorene are heated together with 30 cc. of acetic acid and 100 cc. of water under stirring for 2–4 hours at 100–80° C. After cooling, crystals are separated from the reaction mixture by filtration. The separated crystals are dissolved in dimethyl formamide as small in amount as possible. The solution is added with acetic acid of 10 times the volume thereof and left for crystals to be brought out. By carrying out recrystallization a few times in the same way as above, 7 g. of yellow needle crystals is obtained which melt at 306° C.

What I claim is:

A compound having a melting point of 306° C. and representable by the structural formula

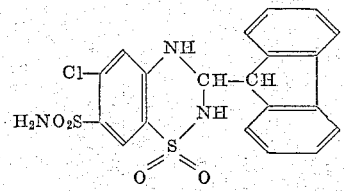

References Cited by the Examiner

UNITED STATES PATENTS

| | | | |
|---|---|---|---|
| 3,081,301 | 3/63 | De Stevens et al. | 260—243 |
| 3,095,446 | 6/63 | Margerison | 260—243 |

FOREIGN PATENTS 863,474    3/61    Great Britain.

OTHER REFERENCES

Yale et al.: Journal of Medicinal and Pharmaceutical Chemistry, pages 122–132 (1958).

NICHOLAS S. RIZZO, *Examiner*.